Dec. 30, 1930.   J. SALOMONSEN   1,787,213
MOTOR TRUCK TRAILER
Filed Nov. 19, 1925    8 Sheets-Sheet 1

Fig. 1

Witnesses:

Inventor:
Jacob Salomonsen
By Joshua R. H. Torre
His Attorney

Dec. 30, 1930.                J. SALOMONSEN                1,787,213
                             MOTOR TRUCK TRAILER
                           Filed Nov. 19, 1925         8 Sheets-Sheet 2

Witnesses:                                    Inventor:
                                              Jacob Salomonsen
                                              By Joshua R. Potts
                                                   His Attorney Dec. 30, 1930.    J. SALOMONSEN    1,787,213
MOTOR TRUCK TRAILER
Filed Nov. 19, 1925    8 Sheets-Sheet 3

Fig. 2A

Witnesses:

Inventor:
Jacob Salomonsen
By Joshua R. H. Potts
His Attorney.

Dec. 30, 1930.  J. SALOMONSEN  1,787,213
MOTOR TRUCK TRAILER
Filed Nov. 19, 1925  8 Sheets-Sheet 4

Dec. 30, 1930. J. SALOMONSEN 1,787,213
MOTOR TRUCK TRAILER
Filed Nov. 19, 1925 8 Sheets-Sheet 5

Dec. 30, 1930.  J. SALOMONSEN  1,787,213
MOTOR TRUCK TRAILER
Filed Nov. 19, 1925   8 Sheets-Sheet 6

Witnesses:

Inventor:
Jacob Salomonsen
By Joshua R H Potts
His Attorney

Dec. 30, 1930.  J. SALOMONSEN  1,787,213
MOTOR TRUCK TRAILER
Filed Nov. 19, 1925  8 Sheets-Sheet 7

Witnesses:

Inventor:
Jacob Salomonsen
By Joshua R H Porr
His Attorney

Patented Dec. 30, 1930

1,787,213

UNITED STATES PATENT OFFICE

JACOB SALOMONSEN, OF GREENWOOD, WISCONSIN

MOTOR-TRUCK TRAILER

Application filed November 19, 1925. Serial No. 69,983.

My invention relates to a motor truck trailer, especially designed to receive driving power from a towing vehicle and to be equipped with its own transmission mechanism whereby to be driven behind the towing vehicle by power received therefrom, and my invention has for its main object the provision of an improved construction of this character which will be able to make short turns in trailing the tow and during the application to its front and rear axles of the driving power received from the tow.

Other objects will appear hereinafter.

The invention consists in the combination and arrangements of parts hereinafter described and claimed.

The invention will be best understood by reference to the accompanying drawings forming a part of this specification, and in which.

Fig. 2—A is a fragmentary vertical sectional view through the transmission mechanism for both the front and rear running gears of the trailer, this view being taken substantially on the line 2A—2A of Fig. 3—A;

Fig. 3—A is a top plan of the parts shown in Fig. 2—A, this view being taken substantially on the line 3A—3A of Fig. 2—A;

Figure 2:
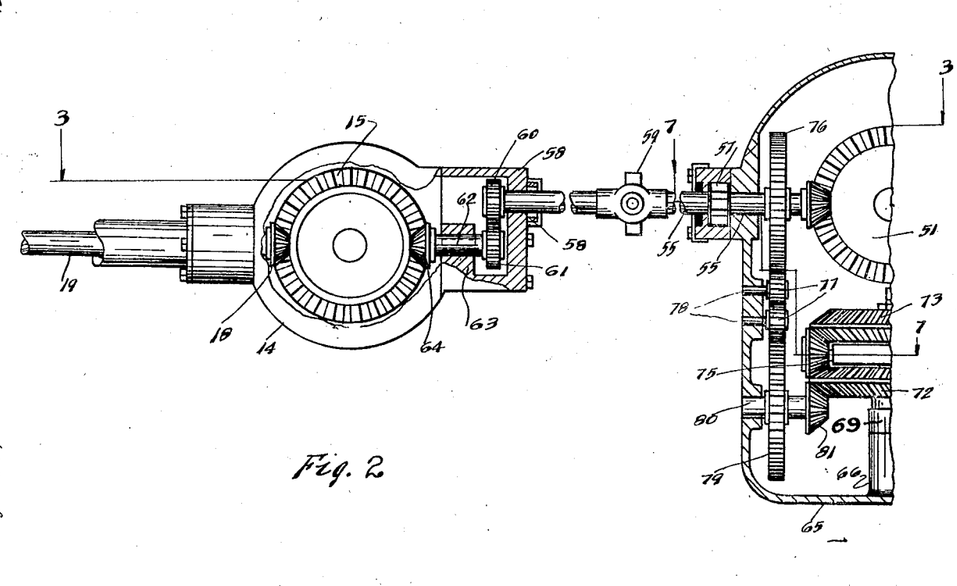
Fig. 2 is a fragmentary vertical sectional view through the transmission mechanism for the rear running gear of the tow and the front running gear of the trailer, this view being taken substantially on the line 2—2 of Fig. 3.
Figure 3:
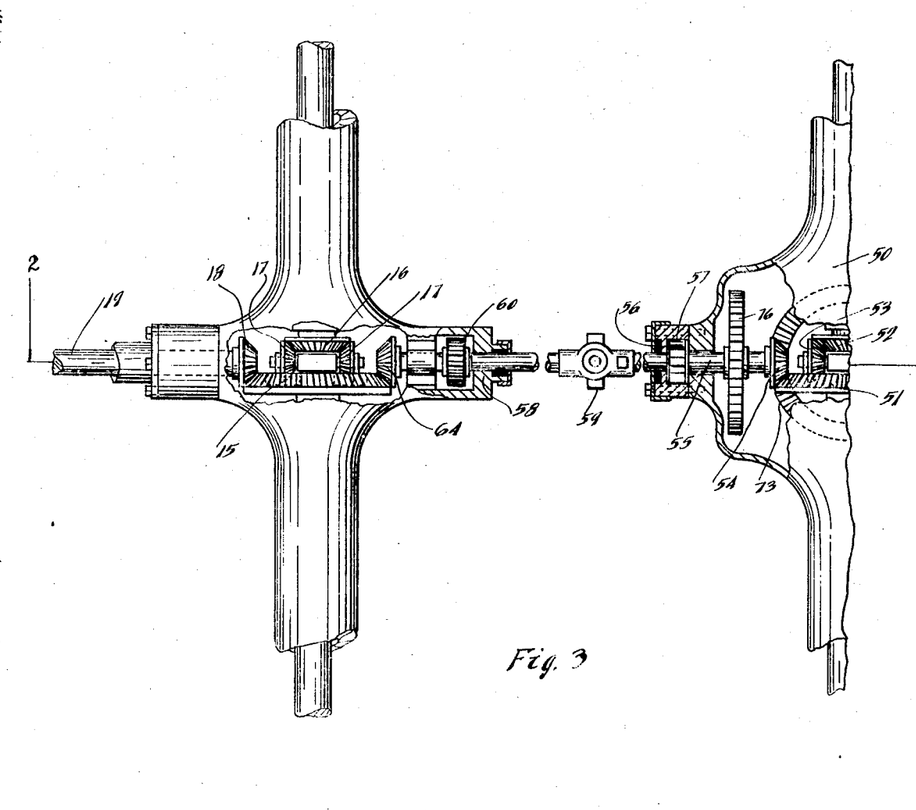
Fig. 3 is a top plan of the parts shown in Fig. 2, this view being taken substantially on the line 3—3 of Fig. 2.

With more particular reference to the parts exemplified in the accompanying drawings, the numeral 12 denotes a fragmentary part of the rear portion of a motor truck tow provided with suitable rear running gear, denoted generally by the numeral 13 and including any suitable type of gear case 14 containing differential gearing of any suitable type whereby, in negotiating turns or curves, the lag of one rear travel wheel will equal substantially the headway of the other rear travel wheel. The differential gearing of gear case 14 is best illustrated in Figs. 2 and 3, and includes a driving gear 15, a differential gear 16 and the usual differential pinions 17. Power is transmitted to driving gear 15 by the usual pinion 18 arranged on the end of the transmission shaft 19 which receives its power from the usual motor or power plant (not shown) carried by the motor truck tow 12.

Figure 2A:
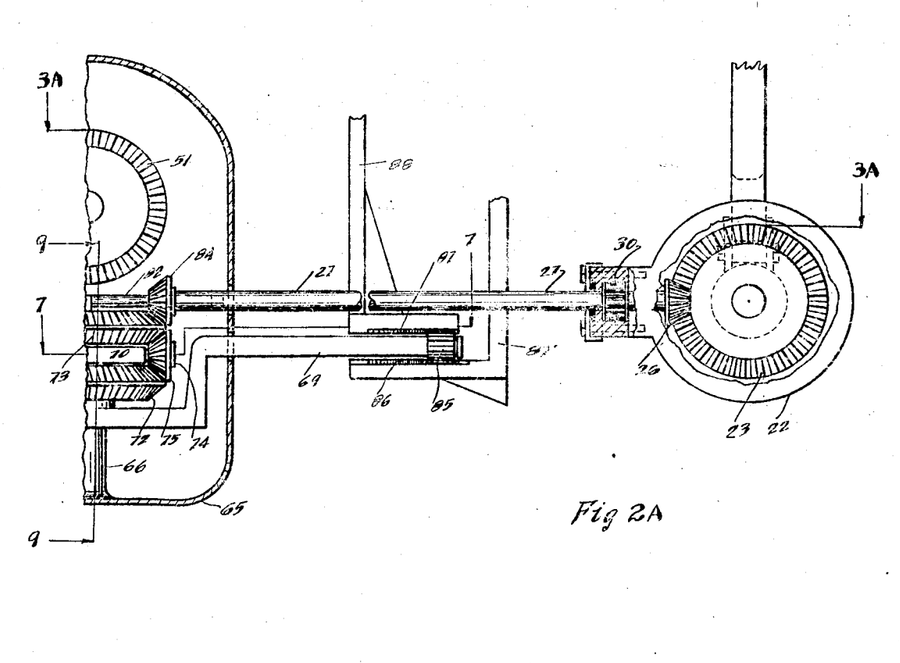
Figure 3A:
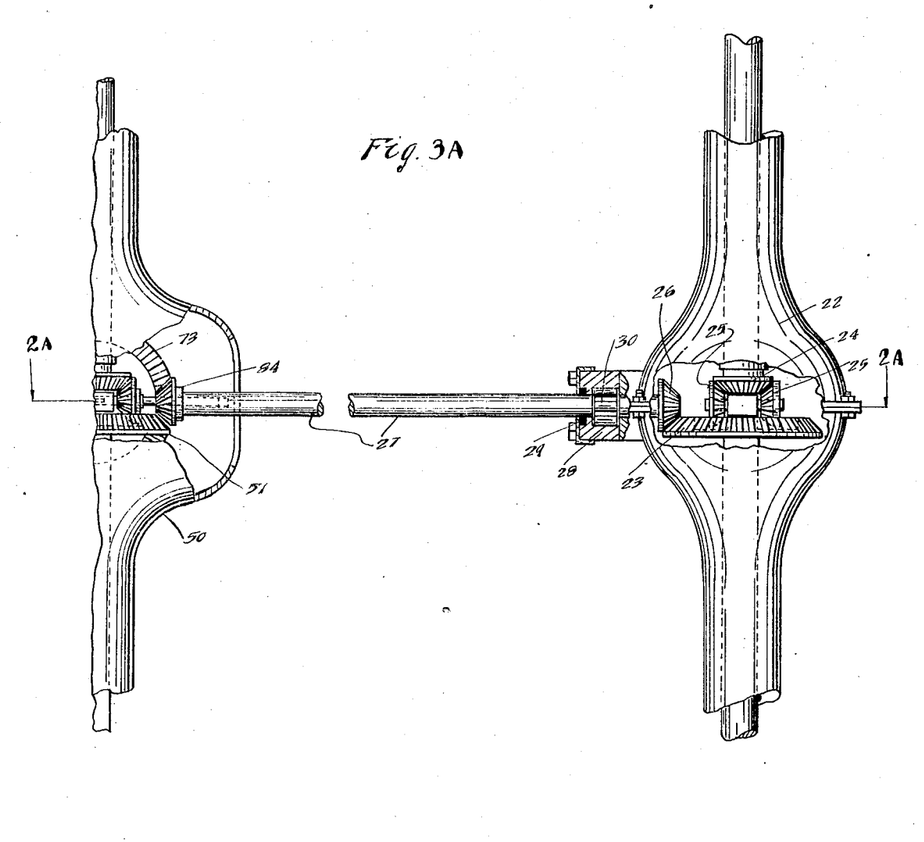

The trailer may consist of any suitable trailer truck having a load carrying truck body 20 supported at the rear by suitable rear running gear 21. Like the rear running gear for the motor truck 12, the rear running gear 21 of the trailer includes a gear case 22 containing differential gearing precisely like that provided for the rear running gear of the motor truck tow. The differential gearing within the gear case 22 is best illustrated in Figs. 2—A and 3—A, the same including a driving gear 23, a differential gear 24 and differential pinions 25. With the driving gear 23 is engaged a pinion 26 provided on the end of the transmission shaft 27 whose rear portion may be conveniently journalled in a bearing 28 projecting from the gear case 22. Preferably and as shown, the transmission shaft 27 is equipped with a wheel 29 provided circumferentially with rollers 30; said wheel 29, with its rollers, being seated within the bearing 28, as best shown in Fig. 3—A, whereby an anti-friction mounting is furnished. The forward portion of the transmission shaft 27 is mounted in association with the compensation gearing, as will be more fully explained hereinafter.

Figure 1:
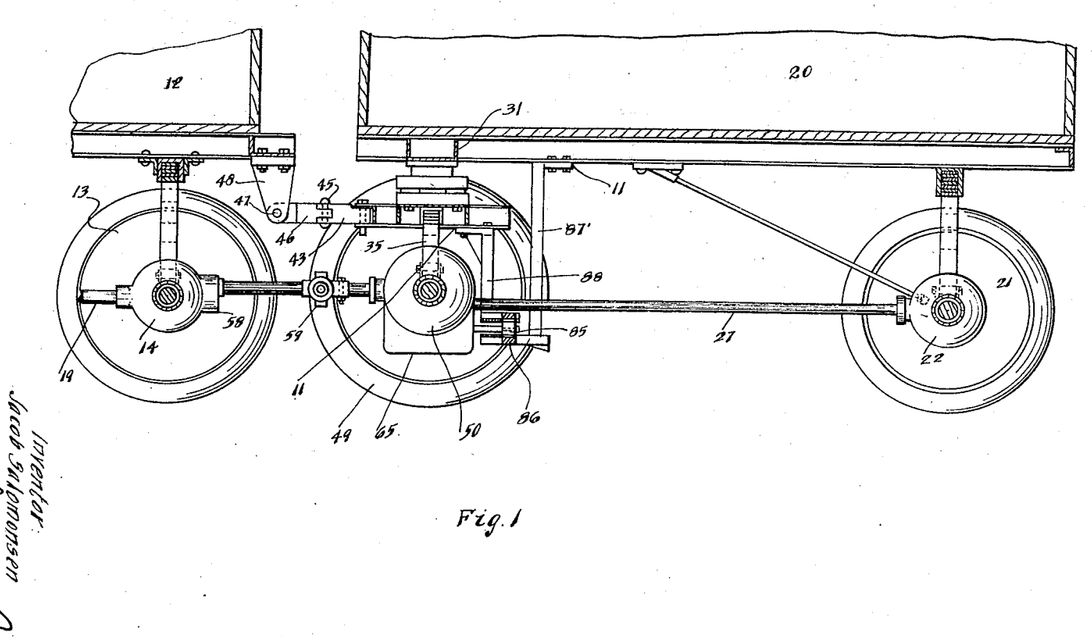
Fig. 1 represents a fragmentary longitudinal sectional elevation of a motor truck tow and a trailer embodying the features of the present invention.
Figures 4, 6:
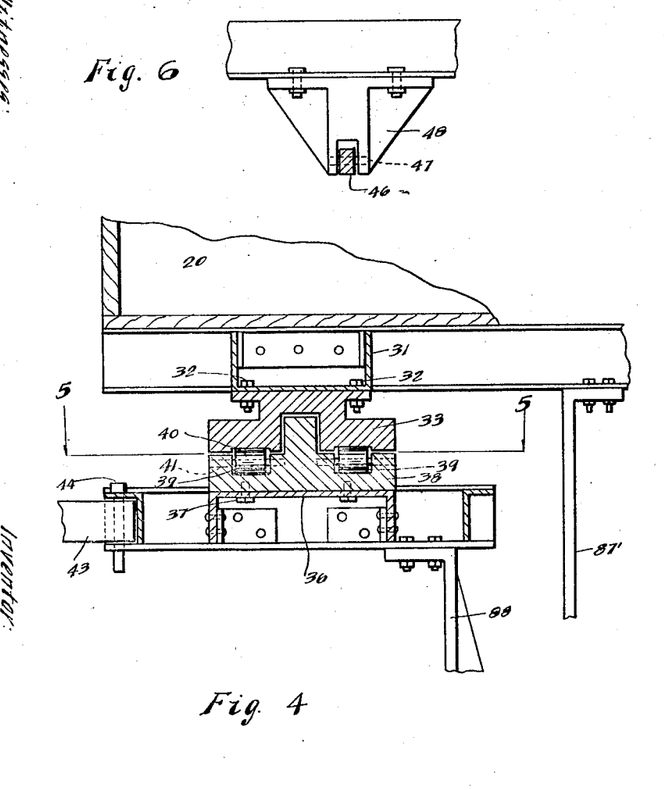
Fig. 4 is a fragmentary longitudinal sectional elevation of the forward portion of the trailer, showing the swiveled connection between the body of the trailer and the front running gear therefor.
Fig. 6 represents a cross section taken on the line 6—6 of Fig. 5.
Figure 5:
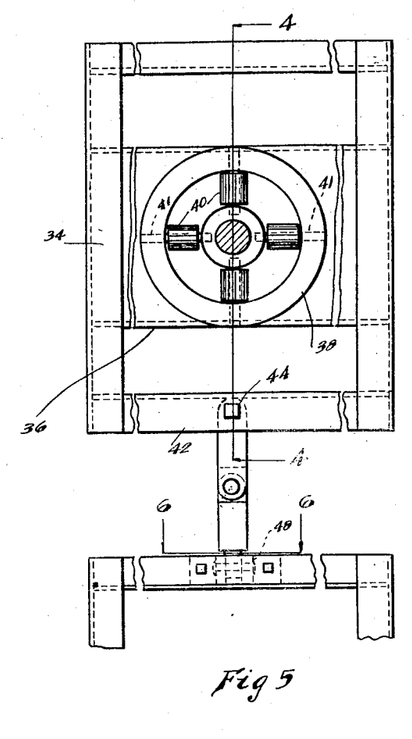
Fig. 5 is a top plan view taken on the line 5—5 of Fig. 4, and showing additionally the coupling between the motor truck tow and the trailer.
Figure 7:
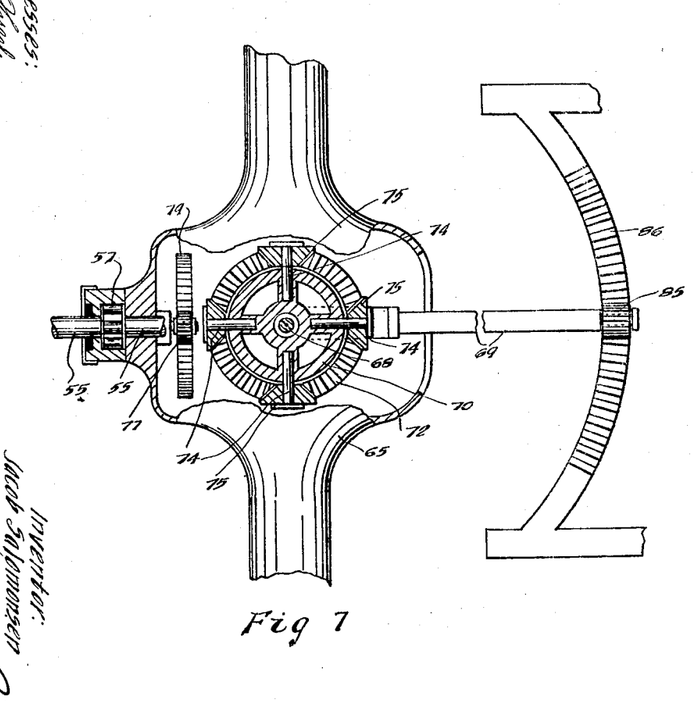
Fig. 7 represents a sectional plan of the transmission mechanism associated with the front running gear of the trailer, this view comprising an assembly of the parts appearing on the line 7—7 of Fig. 2, taken in conjunction with the parts appearing on the line 7—7 of Fig. 2—A.

As will be seen from an inspection of Figs. 1, 4 and 5, the forward portion of the truck body 20 is swiveled upon a front frame with which the front running gear is associated, so that both the front frame and front running gear are adapted to be turned as a unit relatively to the truck body 20. To this end, the truck body 20 may be conveniently provided with an underneath transversely extending bolster 31. To this bolster, midway its length, which means midway the width of the trailer body, there is secured by bolts 32 or other equivalent means, a depending female swivel block 33. 34 represents as a whole the frame to which the front running gear is attached through the semi-elliptical spring 35. The frame 34 is preferably of rectangular form as best shown in Fig. 5, and supports thereon a transversely extending bolster 36 upon which is secured by screws 37, or other suitable means, a male swivel block 38 with which the female swivel 33 cooperates as best illustrated in Fig. 4. The male swivel block 38 is provided with an annular recess 39 in which are arranged a series of rollers 40 whose axes 41 are suitably arranged in the opposing walls defining the annular recess 39, as illustrated in Figs. 4 and 5. By this arrangement, the female swiveled block 33 has anti-frictional mounting upon the male swiveled block 38, so that the front running gear frame 34 may freely turn either to the right or to the left in following the motor truck tow. Provision is made for detachably coupling the front running gear frame to the tow; and to this end, the forward end 42 of the frame, which end is of channel shape in cross section as shown in Figs. 1 and 4, is adapted to receive the end of the tongue 43, the actual connection between this tongue and the channel shaped part 42 consisting preferably of a coupling pin 44 which passes through suitable apertures provided vertically through the framing front part 42 and the tongue 43. In this connection, it will be noted that the pin 44 not only connects the tongue to the frame, but also provides a vertical pivot about which the front running gear of the trailer may relatively turn. To the tongue 43 is pivoted at 45 a forward tongue portion 46 whose forward end is secured upon a horizontal pivot 47 carried by the coupling member 48 depending for the purpose from the rear end of the tow. The coupling thus provided between the tow and the trailer makes provision for both lateral and vertical play between the rear portion of the tow and the front running gear of the trailer.

The front running gear of the trailer, referred to in general by the numeral 49, includes a gear case 50 which contains differential gear precisely like that contained in the gear cases 22 and 14. Thus, the differential gear within the case 50 includes a driving gear 51, a differential gear 52 and the differential pinions 53. As illustrated in Figs. 2 and 3, the driving gear 51 is operated by a pinion 54 on the shaft 55 suitably journalled by means of a roller gear 56 arranged in a bearing 57 projecting from the gear case 50 and also in a bearing head 58 projecting rearwardly from the gear case 14 of the rear running gear of the tow. Incorporated in the shaft 55 is a universal joint 59, which may be of any suitable type. On its forward end, the shaft 55 is provided with a gear 60 which meshes with the gear 61 of the short stud shaft 62 having bearing at 63 in the gear case and having a pinion 64 in mesh with the driving gear 15 of the rear axle differential for the tow. In this manner driving power is taken from the rear axle differential of the tow and transmitted to the front axle differential of the trailer.

Figures 8, 9:
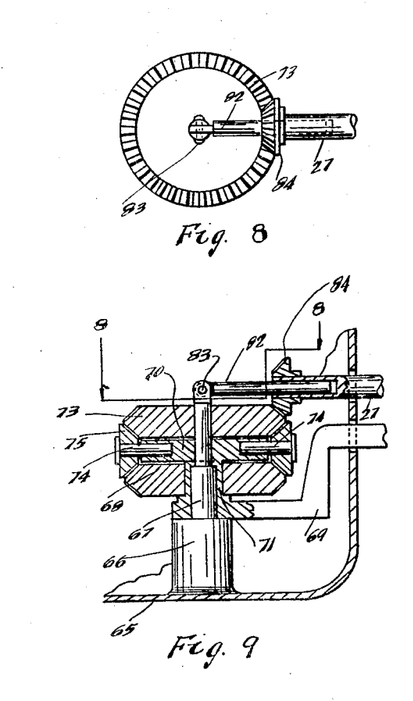
Fig. 8 represents a plan view taken substantially on the line 8—8 of Fig. 9.
Fig. 9 is a central vertical section taken substantially on the line 9—9 of Fig. 2—A.
Figure 10:
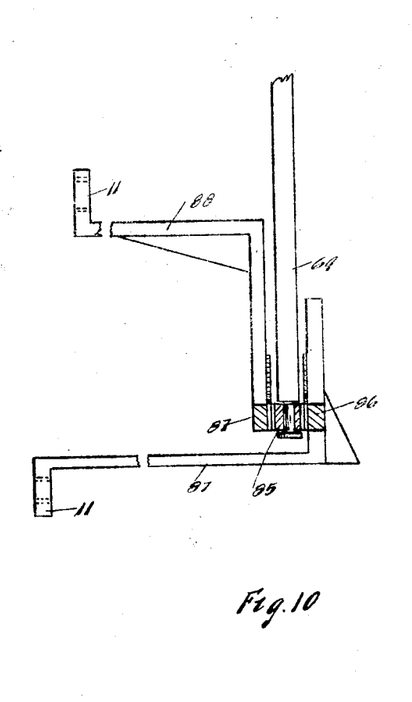
Fig. 10 is a cross section taken through the transversely extending rack bars, this section being taken substantially on the line 10—10 of Fig. 11.
Figure 11:
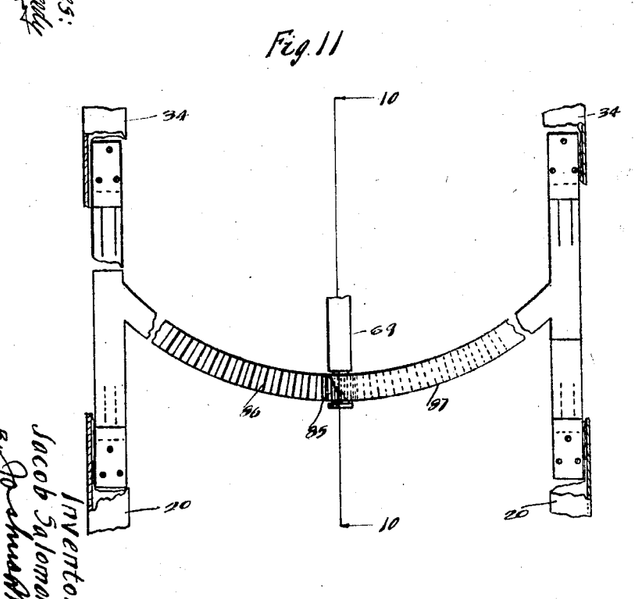
Fig. 11 is a top plan view of the transverse rack bars and parts associated therewith.

In order to carry out the purposes of my improvements, the gear case 50 is made with a depending extension 65 wherein is arranged, below the front axle differential, a compensation gearing arrangement through which power is transmitted from the shaft 55 to the shaft 27. Extending upwardly from the case extension 65 in substantially axial alinement with the axial centers of the swivel blocks, is the stud shaft 66, which is stepped or reduced as at 67 and 68. Mounted upon the stepped or reduced parts 67 and 68 is a combination differential arm 69 and an intermediate disk or gear 70, the same being rigidly connected by a hub 71 on which is rotatably fitted a drive gear 72. Rotatably mounted upon the reduced portion 68, just over the intermediate gear 70, is a driven gear 73. Projecting at suitable intervals from the periphery of the intermediate disk or gear 70 are fixed spindles 74 carrying pinions 75 which are engaged between the drive gear 72 and the driven gear 73. It will be evident that these pinions serve as the means by which power may be transmitted from the drive gear 72 to the driven gear 73. The drive gear 72 receives its power from the shaft 55 through the following chain of gears comprising a gear 76 fixed on the shaft 55; a pair of intermediate gears 77 operable on stud shafts 78 fixed in the extension 65; and the gear 79 fast on the shaft 80 which carries a pinion 81 in mesh with the drive gear 72. As best illustrated in Fig. 9, the transmission shaft 27, at its forward end, has telescoping fit on a retaining arm 82 which is pivoted at 83 to the top end of the stud shaft 66. On the end of the transmission shaft 27, which surrounds the retaining arm 82, is a pinion 84 which is in mesh with the driven gear 73. As will be understood when the trailer is angled relatively to the motor truck, the curved rack 86 supported by the hanger 87' attached to the body of the trailer, will in its sweep to the right or left revolve the pinion 85 whereupon the arm 69 on which the pinion is attached will swing to the left or right to an extent dictated by the movement of the upper rack 87 which latter is attached to the hanger 88 on the frame 34 of the motor truck. In its lateral sweep the arm 69 will revolve the intermediate gear 70 and consequently the pinion 75 on the spindles 74, constituting a compensating system of gearing. By this arrangement, power is taken from the shaft 55 and transmitted to the transmission shaft 27, the incorporation of the compensation gearing comprising drive gear 72, differential pinions 75 and driven gear 73 providing means whereby the swiveled front running gear may be moved relatively to the truck body of the trailer, while power is being continuously transmitted to the transmission shaft 27 for driving the rear axle differential. Moreover, this arrangement, as will be noted, enables a differential to be employed in connection with the swiveled front running gear whereby continuously to apply power to the same during the movements thereof relatively to the trailer body. To better maintain the intermediate gear 70 and to allow full freedom of movement relatively to the trailer body, the differential arm 69 extends rearwardly for a considerable distance as best shown in Fig. 2—A, and is provided with a pinion 85 which is engaged between two curved racks, 86 and 87. As will be best understood from an inspection of Figs. 1, 10 and 11, the lower curved rack 86 is supported at its opposite ends by hangers 87' which depend from the truck body of the trailer. The other curved rack 87 is supported at its opposite ends by hangers 88 which depend from the frame 34. Under this arrangement, the curved rack 86 moves with the movement of the trailer body, while the curved rack 87 moves with the movement of the front running gear which is swiveled under the trailer body. Since the curved racks 86 and 87 always move in opposite directions, the pinion 85 on the differential arm 69 is always found in a position centrally of the racks when the trailer is moving straight ahead, the said pinion deviating from such central position accordingly as the front running gear turns to the right or to the left. As has been previously pointed out, the differential gearing for the rear axle of the tow and for the front and rear axles of the trailer, are preferably of like type and construction, and in this connection it is to be observed that the ratios of the various gears employed throughout the transmission mechanisms should be such that the said differentials will all be driven at a uniform speed, to the end that the trailer will be driven along behind the tow at precisely the same rate of speed with which the tow proceeds.

While I have illustrated and described the preferred form of construction for carrying my invention into effect, this is capable of variation and modification without departing from the sprit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a motor truck trailer having a swiveled front running gear structure; a rear axle differential and a transmission shaft for said differential; said front running gear adapted to be swung on a vertical axis relative to said trailer; of a power receiving shaft on the front running gear structure; a stud shaft substantially coaxial with the swivel axis on which the front running gear structure turns; gearing mounted on the stud shaft comprising a driven gear, a drive gear and an intermediate gear with pinions for operating the driven gear from the drive gear; a drive connection between the power receiving shaft and drive gear; and a driving connection between the driven gear and transmission shaft, substantially as described.

2. The combination with a motor truck trailer having a swiveled front running gear structure, a rear axle differential and a transmission shaft for said differential; of a power receiving shaft on the front running gear structure; a stud shaft on said structure; compensation gearing arranged on said stud shaft for receiving power from the power receiving shaft and transmitting power to the transmission shaft, curved racks carried respectively by said structure and the trailer proper; and a differential arm fixed to said intermediate gear and having a pinion engaging between said racks, substantially as described.

3. The combination with a motor truck trailer having a swiveled front running gear structure; a rear axle differential and transmission shaft for said differential, of a stud shaft arranged on the front running gear structure and carrying a driven gear, a drive gear and an intermediate gear with pinions for operating the driven gear from the drive gear; curved racks carried respectively by said structure and by the trailer proper; a differential arm fixed to said intermediate gear and having a pinion engaging between said racks, and a drive connection between said driven gear and said transmission shaft, substantially as described.

4. The combination with a motor truck trailer having a swiveled front running gear structure; a rear axle differential and a transmission shaft for said differential, of a stud shaft arranged on the front running gear structure and carrying a driven gear, a drive gear and an intermediate gear with pinions for operating the driven gear from the drive gear; curved racks carried respectively by said structure and by the trailer proper; a differential arm fixed to said intermediate gear and having a pinion engaging between said racks, a pinion on the transmission shaft engaging the driven gear; and an arm pivoted to said stud shaft and telescoped by said transmission shaft, substantially as described.

5. A motor truck trailer having, in combination, a rear axle differential; a swiveled front running gear structure including a front axle differential; a power receiving shaft arranged on said structure for operating said front axle differential; compensation gearing arranged on said structure comprising a driven gear, a drive gear and an intermediate gear provided with pinions engaging between the driven gear and drive gear, means for operating the drive gear from said power receiving shaft; means for operating the rear axle differential from said driven shaft; racks carried, respectively, by said structure and the trailer proper; and a differential arm fixed to the intermediate gear and having a gear engaging between said racks, substantially as described.

6. A motor truck trailer having, in combination, a truck body provided with a rear running gear including differential gearing; a transmission shaft connected to said differential gearing; a front running gear associated with a frame structure; said front running gear adapted to be swung on a vertical axis relative to said trailer; a swivel connection connecting the frame structure to the truck body; a coupling part carried by the frame structure by which to connect the trailer to a tow; a power receiving shaft on the frame structure; and means for transmitting power from said power receiving shaft to said transmission shaft and including a gear arrangement on the frame structure adapted to compensate for differences in movement of the swiveled frame structure and truck body, substantially as described.

7. A motor truck trailer having, in combination, a truck body provided with a rear running gear including differential gearing; a transmission shaft for said differential gearing; a front running gear associated with a frame structure; a swivel connecting the frame structure to the truck body; a coupling part on the frame structure by which to connect the trailer to a tow; a power receiving shaft on the frame structure; compensation gearing arranged on the frame structure comprising a driven gear, a drive gear and an intermediate gear with pinions engaging between said drive gear and driven gear; a pair of curved racks supported respectively by the frame structure and truck body; a differential arm on the intermediate gear and having a pinion engaging between said racks; and a driving connection between said driven gear and said transmission shaft, substantially as described.

8. The combination with a motor truck trailer having a swiveled front running gear structure and a rear axle differential, said front running gear adapted to be swung on a vertical axis relative to said trailer of an operating transmission shaft for driving said rear axle differential, a power receiving shaft carried by the front running gear structure and adapted to receive power from a towing vehicle, differential gearing for driving the trailer front wheels, an operative connection between said power receiving shaft and said differential gearing, compensating gearing for driving said operating transmission shaft, and a driving connection between said power receiving shaft and said compensating gearing.

9. In combination with a motor truck provided with power transmission including a rear axle differential, of a trailer chassis, provided with front and rear axle differentials having a driving connection with the front and rear wheels respectively, the trailer front axle adapted to be swung on a vertical axis relative to the trailer rear axle, a power receiving shaft operatively connecting said motor truck rear axle differential and the trailer front axle differential, an operating transmission shaft having a driving connection with said trailer rear axle differential, and compensating gearing operatively connected to said power receiving shaft and to said operating transmission shaft.

10. In combination with a motor truck provided with power transmission including a rear axle differential, of a trailer chassis, provided with front and rear axle differentials having a driving connection with the front and rear wheels respectively, the trailer front axle adapted to be swung on a vertical axis relative to the trailer rear axle, a power receiving shaft operatively connecting said motor truck rear axle differential and the trailer front axle differential, an operating transmission shaft having a driving connection with said trailer rear axle differential, a stud shaft, compensating gearing mounted upon said stud shaft and comprising a gear operatively connected to said power receiving shaft and a driven gear adapted to mesh with a pinion mounted upon the forward end of said operating transmission shaft.

11. The combination of a motor vehicle provided with a rear axle differential, a trailer provided with front and rear axle differentials and having a swiveled front running gear structure connected with said vehicle, the trailer front axle adapted to be swung on a vertical axis relative to the trailer rear axle, a power receiving shaft operatively connecting the vehicle differential mechanism and the trailer front wheel differential, a transmission shaft having a driving connection with said trailer rear axle differential, and gearing operatively interposed between said power receiving shaft and said transmission shaft including compensating differential gearing adapted to maintain an uninterrupted driving connection.

12. The combination of a motor vehicle provided with a rear axle differential, a trailer provided with front and rear axle differentials and having a swiveled front running gear structure connected with said vehicle, the trailer front axle adapted to be swung on a vertical axis relative to the trailer rear axle, a power receiving shaft operatively connecting the vehicle differential mechanism and the trailer front wheel differential, a transmission shaft having a driving connection with said trailer rear axle differential, compensating gearing operatively connected to said power receiving shaft and adapted to be driven thereby, said compensating gearing including a differential having a driving connection with said transmission shaft.

13. The combination of a motor vehicle provided with a rear axle differential, a trailer provided with front and rear axle differentials and having a swiveled front running gear structure connected with said vehicle, the trailer front axle adapted to be swung on a vertical axis relative to the trailer rear axle, a power receiving shaft operatively connecting the vehicle differential mechanism and the trailer front wheel differential, a transmission shaft having a driving connection with said trailer rear axle differential, and compensating gearing arranged on the running gear structure and including a driven gear for operating said transmission shaft and a drive gear operatively connecting said power receiving shaft.

In testimony whereof I have signed my name to this specification.

JACOB SALOMONSEN.